(12) United States Patent
Donham

(10) Patent No.: US 7,692,654 B1
(45) Date of Patent: Apr. 6, 2010

(54) NONDETERMINISTIC PIXEL LOCATION AND IDENTIFICATION IN A RASTER UNIT OF A GRAPHICS PIPELINE

(75) Inventor: Christopher D. S. Donham, San Mateo, CA (US)

(73) Assignee: Nvidia Corporation, Santa Clara, CA (US)

(*) Notice: Subject to any disclaimer, the term of this patent is extended or adjusted under 35 U.S.C. 154(b) by 565 days.

(21) Appl. No.: 11/636,125

(22) Filed: Dec. 8, 2006

(51) Int. Cl.
*G06T 11/20* (2006.01)
*G06T 15/50* (2006.01)
*G06T 15/00* (2006.01)

(52) U.S. Cl. .................. 345/441; 345/426; 345/501; 345/522

(58) Field of Classification Search .......... 345/501, 345/502, 506
See application file for complete search history.

(56) References Cited

U.S. PATENT DOCUMENTS

| | | | | |
|---|---|---|---|---|
| 5,396,582 A | * | 3/1995 | Kahkoska | 358/1.3 |
| 5,461,703 A | * | 10/1995 | Goyins et al. | 358/1.9 |
| 5,706,415 A | * | 1/1998 | Kelley et al. | 345/426 |
| 6,104,374 A | * | 8/2000 | Sullivan et al. | 345/694 |
| 6,204,856 B1 | * | 3/2001 | Wood et al. | 345/608 |
| 6,819,332 B2 | * | 11/2004 | Baldwin | 345/611 |
| 7,068,286 B2 | * | 6/2006 | Powell et al. | 345/611 |
| 2004/0247029 A1 | * | 12/2004 | Zhong et al. | 375/240.16 |

* cited by examiner

*Primary Examiner*—M Good Johnson

(57) ABSTRACT

In a graphics pipeline of a graphics processor, a method for determining pixel location subsequent to rasterization. The method includes receiving a graphics primitive for rasterization in a raster stage of a graphics processor and rasterizing the graphics primitive to generate a plurality of tiles related to the graphics primitive. The method further includes performing a parameter evaluation on each of the plurality of tiles to eliminate noncontributing pixels and to generate a plurality of pixels related to the graphics primitive. A starting location is generated for a first of the plurality of pixels. For each subsequent pixel of the plurality of pixels, a vector to a starting location for each subsequent pixel is generated. Shader processing is performed on the plurality of pixels in a shader stage of the graphics processor by using the start location for the first pixel and the vector for each subsequent pixel.

22 Claims, 6 Drawing Sheets

NONDETERMINISTIC PIXEL LOCATION AND IDENTIFICATION IN A RASTER UNIT OF A GRAPHICS PIPELINE

FIELD OF THE INVENTION

The present invention is generally related to hardware accelerated graphics computer systems.

BACKGROUND OF THE INVENTION

Recent advances in computer performance have enabled graphic systems to provide more realistic graphical images using personal computers, home video game computers, handheld devices, and the like. In such graphic systems, a number of procedures are executed to "render" or draw graphic primitives to the screen of the system. A "graphic primitive" is a basic component of a graphic picture, such as a point, line, polygon, or the like. Rendered images are formed with combinations of these graphic primitives. Many procedures may be utilized to perform 3-D graphics rendering.

Specialized graphics processing units (e.g., GPUs, etc.) have been developed to optimize the computations required in executing the graphics rendering procedures. The GPUs are configured for high-speed operation and typically incorporate one or more rendering pipelines. Each pipeline includes a number of hardware-based functional units that are optimized for high-speed execution of graphics instructions/data, where the instructions/data are fed into the front end of the pipeline and the computed results emerge at the back end of the pipeline. The hardware-based functional units, cache memories, firmware, and the like, of the GPU are optimized to operate on the low-level graphics primitives (e.g., comprising "points", "lines", "triangles", etc.) and produce real-time rendered 3-D images.

The real-time rendered 3-D images are generated using raster display technology. Raster display technology is widely used in computer graphics systems, and generally refers to the mechanism by which the grid of multiple pixels comprising an image are influenced by the graphics primitives. For each primitive, a typical rasterization system generally steps from pixel to pixel and determines whether or not to "render," or write a given pixel into a frame buffer or pixel map, as per the contribution of the primitive. This, in turn, determines how to write the data to the display buffer representing each pixel.

Various traversal algorithms and various rasterization methods have been developed for computing from a graphics primitive based description to a pixel based description (e.g., rasterizing pixel to pixel per primitive) in a way such that all pixels within the primitives comprising a given 3-D scene are covered. For example, some solutions involve generating the pixels in a unidirectional manner. Such traditional unidirectional solutions involve generating the pixels row-by-row in a constant direction. This requires that the sequence shift across the primitive to a starting location on a first side of the primitive upon finishing at a location on an opposite side of the primitive.

Other traditional methods involve utilizing per pixel evaluation techniques to closely evaluate each of the pixels comprising a display and determine which pixels are covered by which primitives. The per pixel evaluation involves scanning across the pixels of a display to determine which pixels are touched/covered by the edges of a graphics primitive.

Once the primitives are rasterized into their constituent pixels, these pixels are then processed in pipeline stages subsequent to the rasterization stage where the rendering operations are performed. Generally, these rendering operations assign a color to each of the pixels of a display in accordance with the degree of coverage of the primitives comprising a scene. The per pixel color is also determined in accordance with texture map information that is assigned to the primitives, lighting information, and the like.

A problem exists however with the ability of prior art 3-D rendering architectures to scale to handle the increasingly complex 3-D scenes of today's applications. Computer screens now commonly have screen resolutions of 1920×1200 pixels or larger. Traditional methods of increasing 3-D rendering performance, such as, for example, increasing clock speed, have negative side effects such as increasing power consumption and increasing the heat produced by the GPU integrated circuit die. Other methods for increasing performance, such as incorporating large numbers of parallel execution units for parallel execution of GPU operations have negative side effects such as increasing integrated circuit die size, decreasing yield of the GPU manufacturing process, increasing power requirements, and the like.

Thus, a need exists for a rasterization process that can scale as graphics application needs require and provide added performance without incurring penalties such as increased power consumption and/or reduced fabrication yield.

SUMMARY OF THE INVENTION

Embodiments of the present invention provide a method and system for a rasterization process that can scale as graphics application needs require and provide added performance without incurring penalties such as increased power consumption and/or reduced fabrication yield.

In one embodiment, the present invention is implemented as a method for determining pixel location subsequent to rasterization in a graphics pipeline of a graphics processor (e.g., a GPU). The method includes receiving a graphics primitive (e.g., a triangle) for rasterization in a raster stage of the graphics processor and rasterizing the graphics primitive to generate a plurality of tiles related to the graphics primitive, where each tile comprises a plurality of pixels (e.g., 16×16 pixel tiles, 8×8 pixel tiles, etc.). The method further includes performing a parameter evaluation on each of the plurality of tiles to eliminate noncontributing pixels and to generate a plurality of pixels related to the graphics primitive. The parameter evaluation can be, for example, a depth test or a stencil test. A starting location is generated for a first of the plurality of pixels. For each subsequent pixel of the plurality of pixels, a vector to a starting location for each subsequent pixel is generated. Shader processing is performed on the plurality of pixels in a shader stage of the graphics processor by using the start location for the first pixel and the vector for each subsequent pixel.

In so doing, the shader stage only receives pixels that are related to the graphics primitive and that have not been eliminated by the parameter evaluation. Pixels which will not contribute to the rendered scene (e.g., as determined by the parameter evaluation) are not sent to the shader stage. By using the start location for the first pixel and the vector for each subsequent pixel, the shader stage can reliably process the pixels received from the rasterization process even though these pixels may be discontiguous and/or arrive in a nondeterministic fashion. By only spending time processing those pixels which will actually contribute to the rendered scene, the rasterization process can scale as graphics applications need without unnecessary duplication of hardware.

BRIEF DESCRIPTION OF THE DRAWINGS

The present invention is illustrated by way of example, and not by way of limitation, in the figures of the accompanying drawings and in which like reference numerals refer to similar elements.

DETAILED DESCRIPTION OF THE INVENTION

Figure 1:
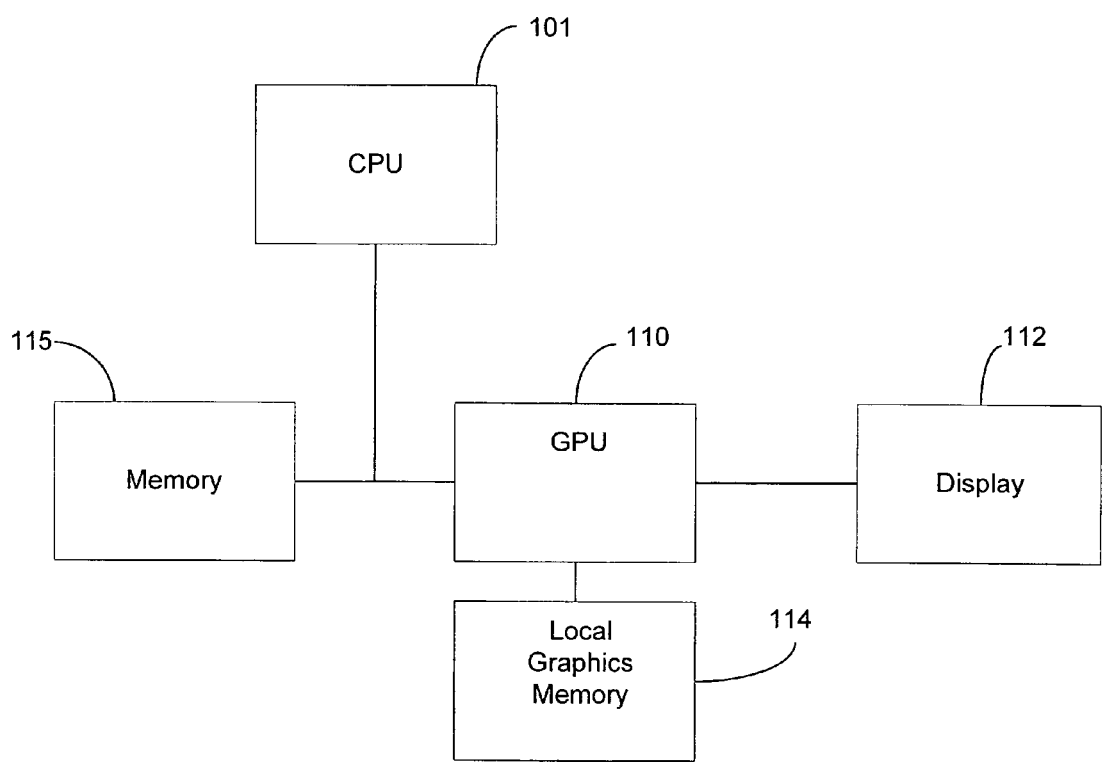
FIG. 1 shows a computer system in accordance with one embodiment of the present invention.

Reference will now be made in detail to the preferred embodiments of the present invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of embodiments of the present invention, numerous specific details are set forth in order to provide a thorough understanding of the present invention. However, it will be recognized by one of ordinary skill in the art that the present invention may be practiced without these specific details. In other instances, well-known methods, procedures, components, and circuits have not been described in detail as not to unnecessarily obscure aspects of the embodiments of the present invention.

Notation and Nomenclature:

Some portions of the detailed descriptions, which follow, are presented in terms of procedures, steps, logic blocks, processing, and other symbolic representations of operations on data bits within a computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "processing" or "accessing" or "executing" or "storing" or "rendering" or the like, refer to the action and processes of a computer system (e.g., computer system 100 of FIG. 1), or similar electronic computing device, that manipulates and transforms data represented as physical (electronic) quantities within the computer system's registers and memories into other data similarly represented as physical quantities within the computer system memories or registers or other such information storage, transmission or display devices.

Computer System Platform:

FIG. 1 shows a computer system 100 in accordance with one embodiment of the present invention. Computer system 100 depicts the components of a basic computer system in accordance with embodiments of the present invention providing the execution platform for certain hardware-based and software-based functionality. In general, computer system 100 comprises at least one CPU 101, a system memory 115, and at least one graphics processor unit (GPU) 110. The CPU 101 can be coupled to the system memory 115 via a bridge component/memory controller (not shown) or can be directly coupled to the system memory 115 via a memory controller (not shown) internal to the CPU 101. The GPU 110 is coupled to a display 112. One or more additional GPUs can optionally be coupled to system 100 to further increase its computational power. The GPU(s) 110 is coupled to the CPU 101 and the system memory 115. System 100 can be implemented as, for example, a desktop computer system or server computer system, having a powerful general-purpose CPU 101 coupled to a dedicated graphics rendering GPU 110. In such an embodiment, components can be included that add peripheral buses, specialized graphics memory, IO devices, and the like. Similarly, system 100 can be implemented as a handheld device (e.g., cellphone, etc.) or a set-top video game console device such as, for example, the Xbox®, available from Microsoft Corporation of Redmond, Wash., or the PlayStation3®, available from Sony Computer Entertainment Corporation of Tokyo, Japan.

It should be appreciated that the GPU 110 can be implemented as a discrete component, a discrete graphics card designed to couple to the computer system 100 via a connector (e.g., AGP slot, PCI-Express slot, etc.), a discrete integrated circuit die (e.g., mounted directly on a motherboard), or as an integrated GPU included within the integrated circuit die of a computer system chipset component (not shown). Additionally, a local graphics memory 114 can be included for the GPU 110 for high bandwidth graphics data storage.

EMBODIMENTS OF THE INVENTION

Embodiments of the present invention implement a method and system for determining pixel location subsequent to rasterization in a graphics pipeline of a graphics processor (e.g., a GPU). The method includes receiving a graphics primitive (e.g., a triangle) for rasterization in a raster stage of the graphics processor and rasterizing the graphics primitive to generate a plurality of tiles related to the graphics primitive, where each tile comprises a plurality of pixels (e.g., 16×16 pixel tiles, 8×8 pixel tiles, etc.). The method further includes performing a parameter evaluation on each of the plurality of tiles to eliminate noncontributing pixels and to generate a plurality of pixels related to the graphics primitive. The parameter evaluation can be, for example, a depth test or a stencil test. A starting location is generated for a first pixel of the plurality of pixels. For each pixel of the plurality of pixels, a vector to a starting location for each subsequent pixel is generated. Shader processing is performed on the plurality of pixels in a shader stage of the graphics processor by using the start location for the first pixel and the vector for each subsequent pixel. Embodiments the present invention and their benefits are further described below.

Figure 2:
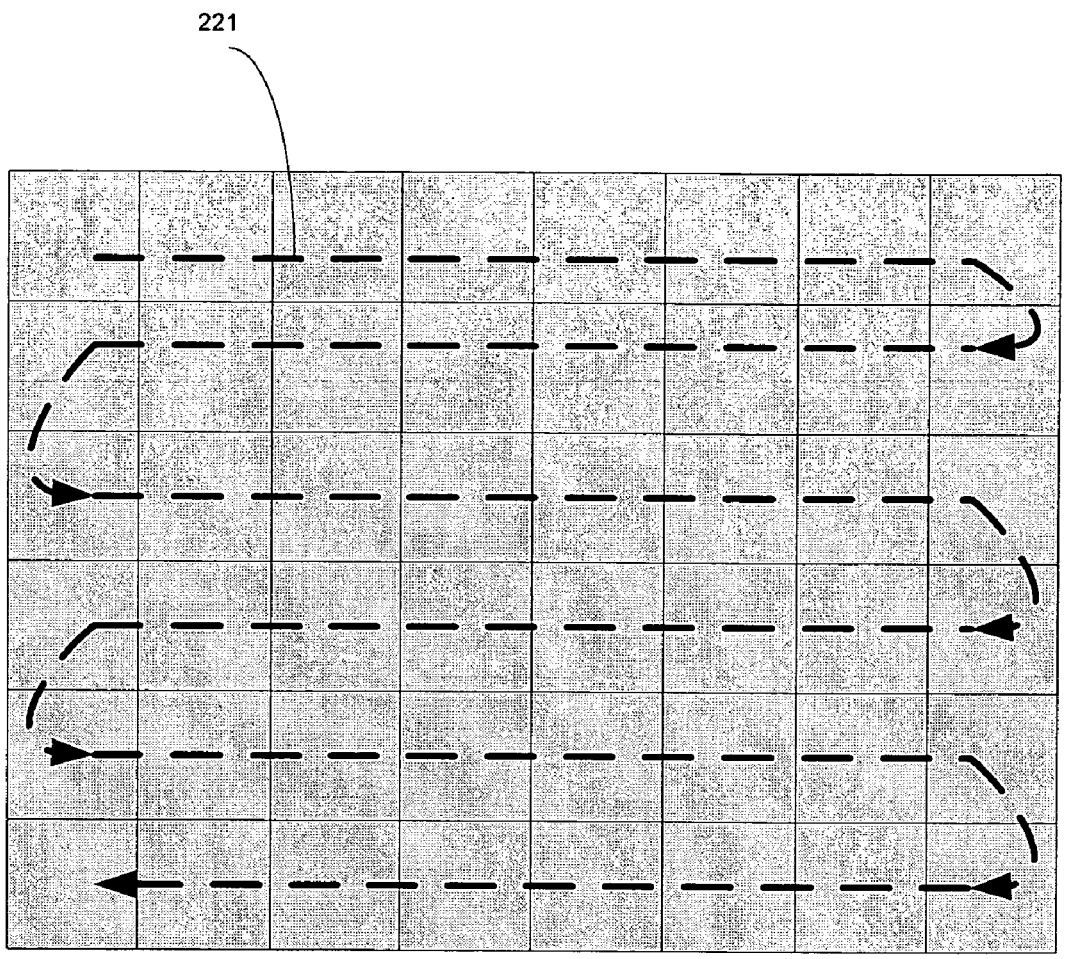
FIG. 2 shows a diagram depicting a grid of pixels being rasterized in a boustrophedonic pattern in accordance with one embodiment of the present invention.

FIG. 2 shows a diagram depicting a grid of pixels being rasterized in a boustrophedonic pattern in accordance with one embodiment of the present invention.

In one embodiment, as depicted in FIG. 2, a raster stage of the GPU 110 utilizes a boustrophedonic pattern for traversing a graphics primitive. As depicted in FIG. 2, the boustrophedonic pattern is indicated by the dotted line 221. In such an embodiment, each pixel of the grid of pixels is traversed in the order indicated by the line 221. The line 221 shows a boustrophedonic pattern of traversal, where the term "boustrophedonic" refers to a traversal pattern which visits all pixels on a 2D area by scanning back and forth along one axis as each pass moves farther along on the orthogonal axis, much as a farmer would plow or mow a field. The term boustrophedonic generally means "as the oxen plows" as in, for example, a field.

Thus, as depicted in FIG. 2, this boustrophedonic rasterization refers to a serpentine pattern that folds back and forth along a predominant axis. In the FIG. 2 example, the predominant axis is horizontal. A horizontal boustrophedonic sequence, for example, may generate all the pixels within a primitive triangle that are on one row from left to right, and then generate the next row right to left, and so on. Such a folded path ensures that an average distance from a generated pixel to recently previously generated pixels is relatively small. Additionally, it should be noted that the boustrophedonic traversal pattern can be implemented on a tile-by-tile basis (e.g., from a generated tile to a recently previously generated tile) as opposed to a pixel-by-pixel basis.

The boustrophedonic pattern has advantages for maintaining a cache of relevant data and reducing the memory requests required for frame buffer and texture access. For example, generating pixels that are near recently generated pixels is important when recent groups of pixels and/or their corresponding texture values are kept in memories of a limited size (e.g., cache memories, etc.). Additional details regarding boustrophedonic pattern rasterization can be found in US Patent Application "A GPU HAVING RASTER COMPONENTS CONFIGURED FOR USING NESTED BOUSTROPHEDONIC PATTERNS TO TRAVERSE SCREEN AREAS" by Franklin C. Crow et al., Ser. No. 11/304,904, filed on Dec. 15, 2005, which is incorporated herein in its entirety.

It should be noted that although embodiments of the present invention are described in the context of boustrophedonic rasterization, other types of rasterization patterns can be used. For example, the algorithms and GPU stages described herein for rasterizing tile groups can be readily applied to traditional left-to-right, line-by-line rasterization patterns.

Figure 3:
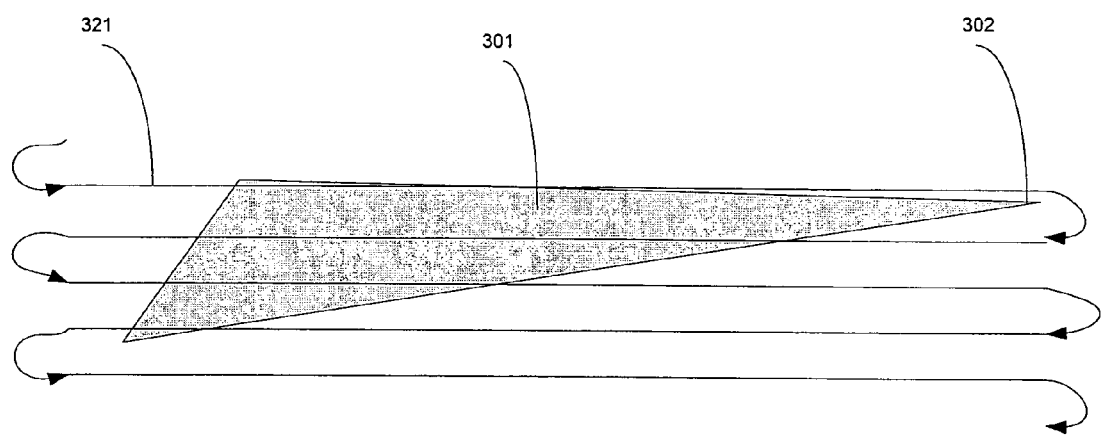
FIG. 3 shows a diagram of a triangle polygon against a rasterization pattern for a raster unit of a GPU in accordance with one embodiment of the present invention.

FIG. 3 shows a diagram of a triangle 301 against a rasterization pattern 321 for a raster unit of the GPU 110 in accordance with one embodiment of the present invention.

As described above, the line 321 shows a boustrophedonic pattern of traversal, where the raster unit visits all pixels on a 2D area of the triangle 301 by scanning along one axis as each pass moves farther along on the orthogonal axis. As shown in the FIG. 3 embodiment, a raster unit of the GPU 110 traverses the triangle 301 and stamps out tiles that have at least some coverage with respect to the triangle 301. The resulting tiles subsequently sent down the graphics pipeline for further processing.

Figure 4:
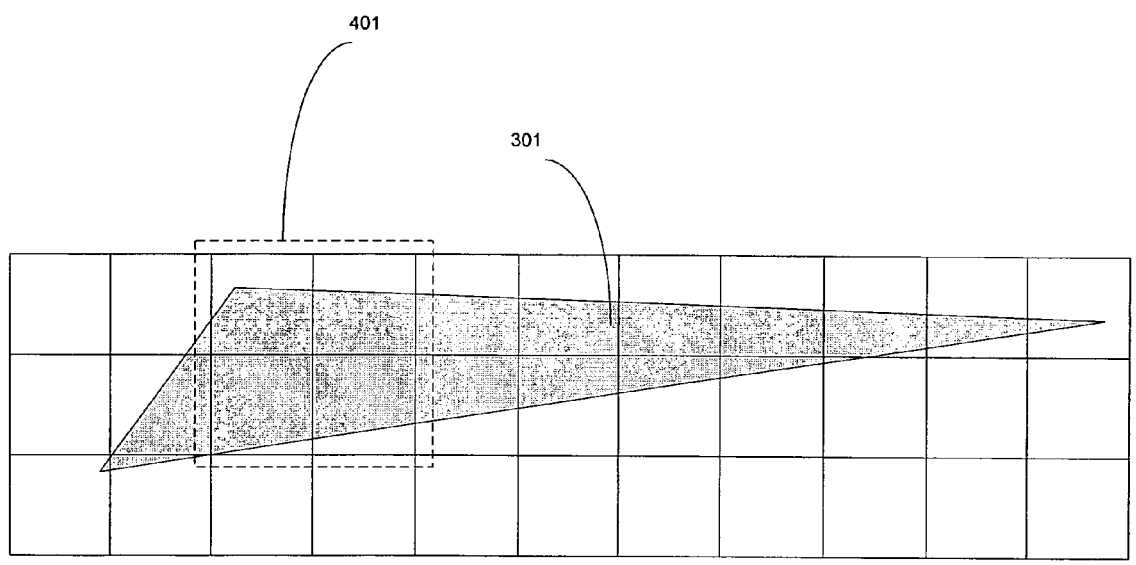
FIG. 4 shows a diagram of the triangle against a grid of tiles as they are being examined by the rasterizer unit in accordance with one embodiment of the present invention.

FIG. 4 shows a diagram of the triangle 301 against a grid of tiles as they are examined by the first level rasterization process in accordance with one embodiment of the present invention. In FIG. 4, each of the illustrated squares represents a tile comprised of pixels (e.g., 16×16, 8×8, etc.). FIG. 4 shows a case where the rasterization process performed by the raster unit of the GPU 110 produces tile groups comprised of four tiles each, such as the exemplary tile group 401. Thus, in a case where each tile comprises 16×16 pixels, the raster unit of the GPU 110 can stamp out a 1024 pixel tile group each clock cycle. The generation of such large tile groups can be considered as a form of coarse rasterization, where large groups of pixels are considered at one time to quickly determine which pixels of a large screen area (e.g., 1600×1200, 1920×1200 etc.) are relevant and which pixels of the screen area can be discarded. The large tile groups can be examined in detail in a subsequent stage, where each pixel, or small group of pixels (e.g., 2×2 pixels), of the large tile group is examined to determine a more fine degree of coverage by the triangle 301.

In this manner, a coarse rasterization is intended to quickly determine which pixels of the screen area relate to a given graphics primitive. Accordingly, relatively large groups of pixels (e.g., tiles) are examined at a time in order to quickly find those pixels that relate to the primitive. The process can be compared to a reconnaissance, whereby the coarse raster unit quickly scans a screen area and finds tiles that cover the triangle 301. Thus the pixels that relate to the triangle 301 can be discovered much more quickly than a traditional prior art process which utilizes a single level of rasterization and examines much smaller numbers of pixels at a time, in a more fine-grained manner.

Figure 5:
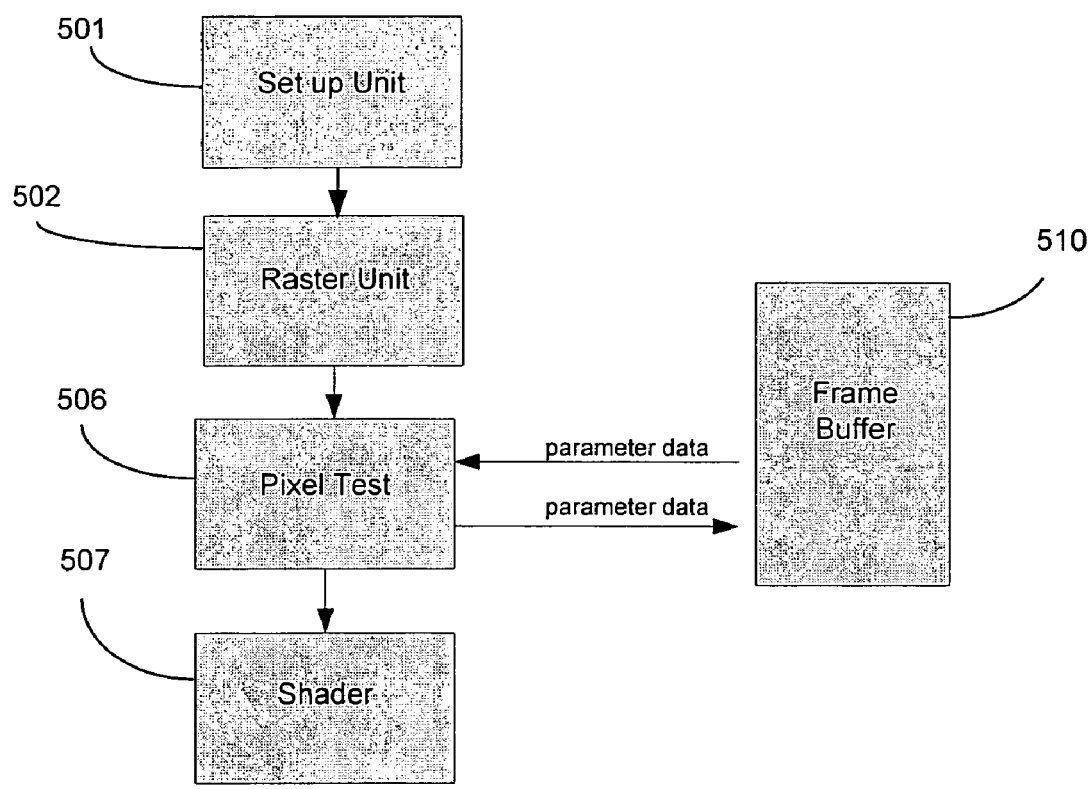
FIG. 5 shows a diagram depicting a graphics pipeline in accordance with one embodiment of the present invention.

FIG. 5 shows a diagram depicting a graphics pipeline in accordance with one embodiment of the present invention.

The FIG. 5 embodiment illustrates exemplary internal components comprising a pipeline of the GPU 110. As shown in FIG. 5, the GPU 110 includes a setup unit 501 and a rasterizer unit 502. Generally, the set up unit 501 functions by converting descriptions based on vertices to descriptions based on edge descriptions. The rasterizer unit 502 subsequently converts these edge descriptions into filled areas comprising actual pixel descriptions (e.g., pixel areas, pixel sub-samples, etc.). The pixel descriptions are subsequently passed along to other units within the GPU 110 for further processing and rendering.

The pixel test unit 506 is coupled to receive the tiles generated by the raster unit 502. The pixel test unit 506 functions by performing a number of different parameter evaluation processes on the pixels comprising the tiles received from the raster unit 502. The parameter evaluation process can be one of the number of different evaluation processes, or pixel tests, which determine the degree to which the tiles from a given primitive influence pixel colors in the frame buffer 510. For example, in one embodiment, the parameter evaluation process can be a depth evaluation process, where, for example, depth values for the tiles passed from the raster unit 502 are tested against the depth values for those pixels are already residing within the frame buffer 510. Those pixels which are occluded by primitives already rendered into the frame buffer can be discarded.

Similarly, in one embodiment, the parameter evaluation process can be a transparency evaluation, where a transparency value for the tiles passed from raster unit 502 are tested against the pixels already in the frame buffer. Those pixels which have 100% transparency will have no effect on the colors already rendered into the frame buffer and can be discarded.

In yet another embodiment, the parameter evaluation process can be a stencil evaluation, where a stencil is processed against the pixels comprising the primitive. Those pixels which are stenciled out by the stencil process will not be rendered into the frame buffer and can be discarded.

In each case, the objective is to identify pixels of tiles which will not ultimately be drawn into the frame buffer 510 and discard them prior to transmission to the shader unit 507 to save processing bandwith. For example, in a case where the parameter comprises a depth value, the objective is to identify those tiles which are behind other primitives, or are otherwise occluded, and discard them prior to transmission to a subsequent stage of the pipeline.

With respect to the frame buffer 510, it should be noted that the frame buffer 510 can be implemented as a portion of the local graphics memory 114 shown in FIG. 1, or alternatively, as a portion of the system memory 115.

The shader unit 507 performs pixel shader processing for each of the pixels comprising the tiles. The shader unit 507 typically receives the tiles in a piecemeal manner as pixel "quads" (e.g., groups of 2×2 pixels) and operates on the quads in accordance with the parameters iterated across each of the pixels.

In accordance with embodiments of the present invention, the shader unit 507 is advantageously configured to handle noncontiguous pixel streams and/or non-deterministically arriving pixel streams as they arrive from the pixel test unit 506.

As used herein, a noncontiguous pixel stream refers to pixels which may arrive without any contiguous relationship to one another. For example, in a conventional prior art pipeline, a rasterizer follows a standard order when generating the pixels or groups of pixels covered by a particular primitive. For example, it might simply go left to right across scan lines, or it might follow a more complicated (but deterministic) space filling curve such as a Hilbert curve. A typical system might pass the starting location for a scan line or Hilbert curve, and then subsequent logic could regenerate the current position by knowing how many pixels/quads have been drawn since the starting location was provided. Such a system relies on the contiguity of the pixel stream to determine the pixel location; deleting a pixel from the middle of the pixel stream would cause all subsequent pixels to have an incorrect location. One drawback of such a system is that by following such a deterministic/contiguous pixel stream pattern, pixel data is sent to subsequent stages of the graphics pipeline even though that pixel data may not be related to the graphics primitive or be relevant to the ultimately rendered scene. Another typical system might pass the location of each quad with the quad so that the position is always known. Such systems can handle pixels in an arbitrary order and can tolerate deletions from anywhere in the pixel stream, but have the cost of sending the full-precision location of each pixel throughout the pipeline.

In contrast, embodiments in the present invention employ one or more pixel evaluation tests (e.g., performed by the pixel test unit 506) to discard noncontributing pixels prior to passing them on to the shader unit 507.

In the graphics pipeline 500 embodiment, the rasterization process is immediately followed by the pixel tests for depth and stencil as performed by the pixel test unit 506. As a result, the output received by the shader unit 507 after these tests does not follow a predictable pattern since pixels which fail one or more pixel evaluation tests (e.g., depth, stencil, etc.) are not transmitted from the pixel test unit 506. Thus, a graphics pipeline 500 embodiment avoids passing the starting location for a string of pixels, which would be very inefficient since there will often be small sequences of contiguous pixels. Similarly, a graphics pipeline 500 embodiment avoids passing the location of each pixel group, which would be costly due to the area required to represent this information throughout the pipeline.

Instead, the graphics pipeline 500 embodiment optimizes its performance by generating the starting location for a stream of pixels/quads. Then, for each subsequent pixel/quad, the distance to the following pixel/quad is provided with the pixel/quad. For example, if the first pixel is at X, Y location (10, 10), and then the next pixel is at location (15, 11), the output from the pixel test unit 506 would be "START (10, 10), PIXEL(+5, +1) . . ." In this manner, gaps in the pixel sequence are allowed, yet storage for the full (X, Y) location is not required throughout the pipeline.

In one embodiment, the graphics pipeline 500 is further optimized by transmitting four pixels in sequence. For example, since the four pixels in a quad are transmitted in sequence back-to-back, the delta information, which essentially functions as a vector to the next starting point, can be spread across multiple cycles further reducing the number of bits required. Additionally, in an embodiment optimized to render quads rather than individual pixels, a further cost reduction is obtained since a quad delta is transmitted rather than a pixel delta.

In so doing, the shader stage only receives pixels that are related to the graphics primitive and that will not be eliminated by the parameter evaluation. Pixels which will not contribute to the rendered scene (e.g., as determined by the parameter evaluation) are not sent to the shader stage. By using the start location for the first pixel and the vector, or delta, for each subsequent pixel, the shader stage can reliably process the pixels received from the rasterization process even though these pixels may be discontiguous and/or arrive in a nondeterministic fashion. By only spending time processing both pixels which will actually contribute to the rendered scene, the rasterization process can scale as graphics applications need without unnecessary duplication of hardware.

In the embodiments described above, each pixel, or quad, was transmitted with the vector for the subsequent pixel or quad. In another embodiment, each pixel or quad has the vector relative to the previous pixel or quad. In such an embodiment, if the pixel or quad data is transmitted in multiple clocks, the location of the pixel or quad may not be known until some or all of the pixel data was received. For example, in a system where a 2×2 pixel quad is processed atomically and where 1 pixel is transmitted with each clock, if the vector contained with each quad provides the distance from the previous quad, and if the vector is transmitted in pieces with each clock in the quad, then the location of the current quad is not known until all 4 clocks of the quad have been received. In contrast, in an embodiment which transmits the location from the current quad to the next quad, the location of each quad is known from the very first clock cycle for the quad. Consequently, it may be possible to begin processing the quad before all 4 cycles have arrived. In this embodiment, the location of the first quad may be transmitted prior to the first quad. The performance and area trade-off for each implementation will guide the proper choice.

In the embodiments described above, each quad contains a vector from the previous quad or to the next quad in daisy-chain fashion. In another embodiment, each quad contains a vector from a common starting location. In this embodiment, the starting location may be transmitted prior to the first quad. Then each quad may contain a vector or address relative to the starting location.

Figure 6:
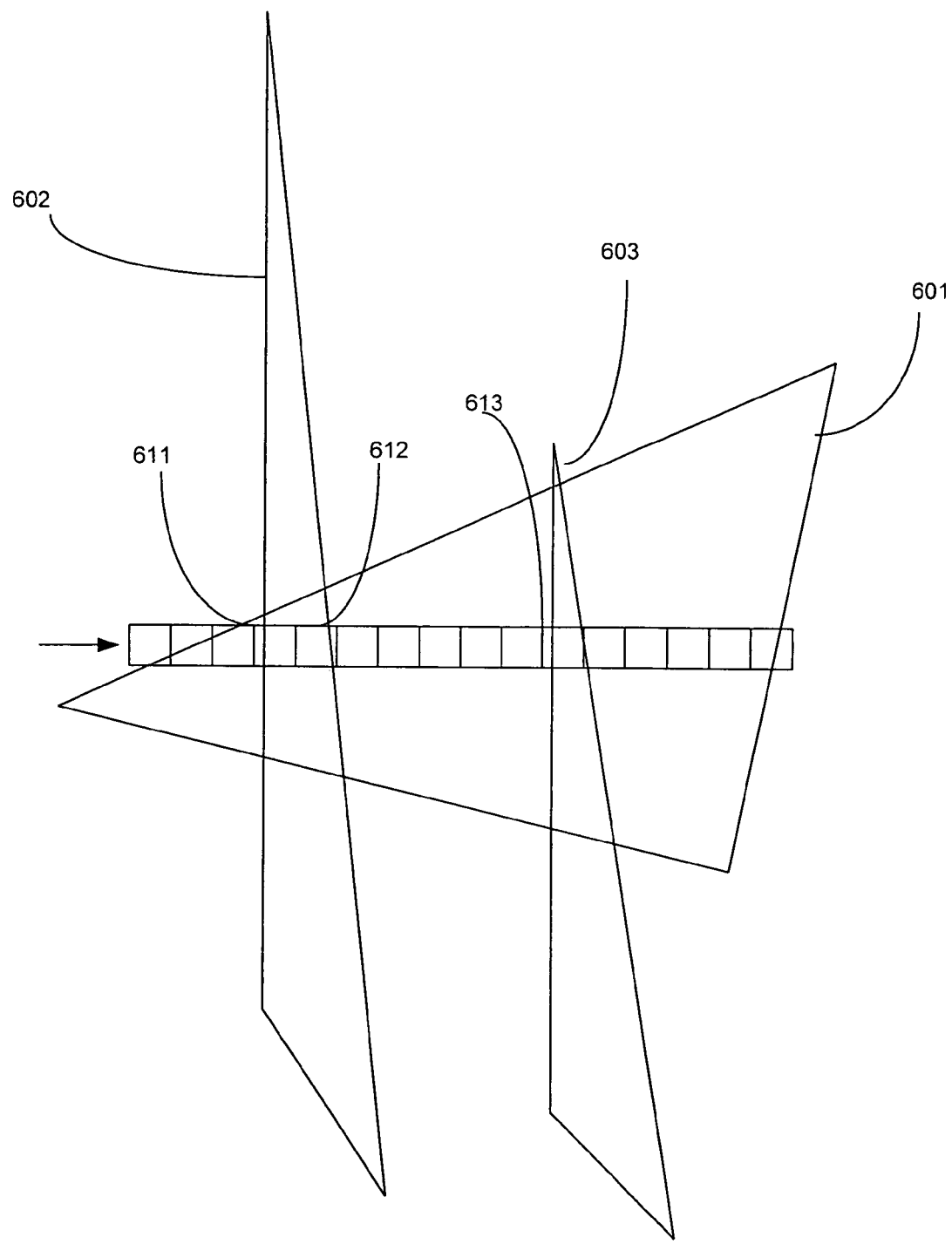
FIG. 6 shows a diagram illustrating a line of 16 pixels from one tile where some of the 16 pixels fail depth testing in accordance with one embodiment of the present invention.

FIG. 6 shows a diagram illustrating a line of 16 pixels from one tile where some of the 16 pixels fail depth testing. As depicted in FIG. 6, the 16 pixels are illustrated as a row of squares and typically comprise one row of a 16×16 pixel tile. The 16 pixels are shown traversing a first polygon 601 and have at least some coverage of the first polygon 601. A second polygon 602 and a third polygon 603 which have been rendered prior to polygon 601 are shown. In this example, both polygon 602 and polygon 603 are in front of polygon 601, obscuring polygon 601 from view where overlaps occur. Consequently, the pixels 611 and 612 and the pixel 613 are occluded, fail depth test evaluation performed by the pixel test unit 506, and are discarded. The remaining pixels of line are then sent to the shader unit 507 for further processing. Since the pixels 611, 612, and 613 have been removed, the remaining pixels of the line will arrive non-contiguously, and may arrive non-deterministically. However, since the pixel start position and the vector positions are sent, the remaining pixels of line can be reliably processed by the shader unit 507 as described above.

The foregoing descriptions of specific embodiments of the present invention have been presented for purposes of illustration and description. They are not intended to be exhaustive or to limit the invention to the precise forms disclosed, and many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. In a graphics pipeline of a graphics processor, a method for determining pixel location subsequent to rasterization, comprising:
    receiving a graphics primitive for rasterization in a raster stage of a graphics processor;
    rasterizing the graphics primitive to generate a plurality of pixels related to the graphics primitive;
    performing a parameter evaluation on each of the plurality of pixels to eliminate noncontributing pixels;
    generating a starting location for a first of the plurality of pixels;
    for each subsequent pixel of the plurality of pixels, generating a vector to a starting location for each subsequent pixel from a current pixel;
    performing shader processing on the plurality of pixels in a shader stage of the graphics processor by using the start location for the first pixel and the vector for each subsequent pixel.

2. The method of claim 1, wherein the starting location for the first pixel comprises an x y-coordinate for the first pixel.

3. The method of claim 1, wherein the vector to the starting location for the subsequent pixel comprises an x and y distance to the subsequent pixel.

4. The method of claim 1, wherein the parameter evaluation performed comprises a depth test evaluation.

5. The method of claim 1, wherein the parameter evaluation performed comprises a stencil test evaluation.

6. The method of claim 1, wherein the parameter evaluation performed comprises a transparency test evaluation.

7. The method of claim 1, wherein at least one of the plurality of pixels is a noncontiguous pixel.

8. The method of claim 1, wherein the plurality of pixels received by the shader stage are received in an arbitrary order.

9. A GPU (graphics processor unit), comprising:
    a set-up unit for generating polygon descriptions of a graphics primitive;
    a rasterizer unit coupled to the set-up unit for generating a plurality of pixels related to the graphics primitive;
    a pixel test unit coupled to the rasterizer unit for performing a parameter evaluation on each of the plurality of pixels to eliminate noncontributing pixels and to generate a plurality of pixel groups related to the graphics primitive, and for generating a starting location for a first of the plurality of pixel groups, and for each subsequent pixel group of the plurality of pixel groups, generating a vector to a starting location for each subsequent pixel group from a current pixel group;
    a shader unit coupled to the pixel test unit for performing shader processing on the plurality of pixel groups by using the start location for the first pixel group and the vector for each subsequent pixel group.

10. The GPU of claim 9, wherein the pixel groups comprise 2×2 pixels.

11. The GPU of claim 9, wherein the starting location for the first pixel group comprises an x y-coordinate for the first pixel group.

12. The GPU of claim 9, wherein the vector to the starting location for the subsequent pixel group comprises an x and y distance to the subsequent pixel group.

13. The GPU of claim 9, wherein the parameter evaluation performed comprises a depth test evaluation.

14. The GPU of claim 9, wherein the parameter evaluation performed comprises a stencil test evaluation.

15. The GPU of claim 9, wherein the parameter evaluation performed comprises a transparency test evaluation.

16. The GPU of claim 9, wherein at least one of the plurality of pixel groups is a noncontiguous pixel group.

17. The GPU of claim 9, wherein the plurality of pixel groups received by the shader stage are received in an arbitrary order.

18. A computer system, comprising:
    a system memory;
    a central processor unit coupled to the system memory; and
    a graphics processor unit communicatively coupled to the central processor unit;
    a set-up unit within the graphics processor unit for generating polygon descriptions of a graphics primitive;
    a rasterizer unit coupled to the set-up unit for generating a plurality of tiles related to the graphics primitive;
    a pixel test unit coupled to the rasterizer unit for performing a parameter evaluation on each of the plurality of tiles to eliminate noncontributing pixels and to generate a plurality of pixel groups related to the graphics primitive, and for generating a starting location for a first of the plurality of pixel groups, and for each subsequent pixel group of the plurality of pixel groups, generating a vector to a starting location for each subsequent pixel group;
    a shader unit coupled to the pixel test unit for performing shader processing on the plurality of pixel groups by using the start location for the first pixel group and the vector for each subsequent pixel group.

19. The computer system of claim 18, wherein the starting location for the first pixel group comprises an x y-coordinate for the first pixel group.

20. The computer system of claim 19, wherein the vector to the starting location for the subsequent pixel group comprises an x and y distance to the subsequent pixel group.

21. In a graphics pipeline of a graphics processor, a method for determining pixel location subsequent to rasterization, comprising:
- receiving a graphics primitive for rasterization in a raster stage of a graphics processor;
- rasterizing the graphics primitive to generate a plurality of pixels related to the graphics primitive;
- performing a parameter evaluation on each of the plurality of pixels to eliminate noncontributing pixels;
- generating a starting location for a first of the plurality of pixels;
- transmitting the starting location to the shader;
- for each subsequent pixel, transmitting a vector to the start location for the next pixel of the plurality of pixels;
- performing shader processing on the plurality of pixels in a shader stage of the graphics processor by using the start location for the first pixel and the vector for each subsequent pixel.

22. In a graphics pipeline of a graphics processor, a method for determining pixel location subsequent to rasterization, comprising:
- receiving a graphics primitive for rasterization in a raster stage of a graphics processor;
- rasterizing the graphics primitive to generate a plurality of pixels related to the graphics primitive;
- performing a parameter evaluation on each of the plurality of pixels to eliminate noncontributing pixels;
- generating a starting location for a first pixel of the plurality of pixels;
- transmitting the starting location to the shader;
- for each subsequent pixel, transmitting a vector to the start location for the subsequent pixel from the start location of the first pixel;
- performing shader processing on the plurality of pixels in a shader stage of the graphics processor by using the start location for the first pixel and the vector for each subsequent pixel.

* * * * *